(12) United States Patent
Alsaihati et al.

(10) Patent No.: US 11,268,380 B2
(45) Date of Patent: Mar. 8, 2022

(54) KICK DETECTION USING LOGGING WHILE DRILLING

(71) Applicant: Saudi Arabian Oil Company, Dhahran (SA)

(72) Inventors: Zainab Alsaihati, Saihat (SA); Bader Otaibi, Dhahran (SA); Abdullah Saleh Al-Yami, Dhahran (SA); Salem H. Al Gharbi, Damamm (SA)

(73) Assignee: Saudi Arabian Oil Company, Dhahran (SA)

( * ) Notice: Subject to any disclaimer, the term of this patent is extended or adjusted under 35 U.S.C. 154(b) by 55 days.

(21) Appl. No.: 16/855,182

(22) Filed: Apr. 22, 2020

(65) Prior Publication Data

US 2021/0332698 A1  Oct. 28, 2021

(51) Int. Cl.
*E21B 49/00* (2006.01)
*E21B 47/10* (2012.01)
(Continued)

(52) U.S. Cl.
CPC ............ *E21B 49/003* (2013.01); *E21B 47/06* (2013.01); *E21B 47/07* (2020.05); *G01V 11/002* (2013.01)

(58) Field of Classification Search
CPC ...... E21B 49/00; E21B 49/005; E21B 49/006; E21B 47/00; E21B 47/10; E21B 41/0092; E21B 21/08; E21B 44/00
See application file for complete search history.

(56) References Cited

U.S. PATENT DOCUMENTS 4,879,654 A * 11/1989 Bruce .................. E21B 49/006
702/9
4,949,575 A * 8/1990 Rasmus .................. E21B 21/08
166/250.01
(Continued)

FOREIGN PATENT DOCUMENTS

CN          104698501          3/2017

OTHER PUBLICATIONS

PCT International Search Report and Written Opinion in International Appln. No. PCT/US2021/027892, dated Jul. 23, 2021, 19 pages.
(Continued)

*Primary Examiner* — Kenneth L Thompson
(74) *Attorney, Agent, or Firm* — Fish & Richardson P.C.

(57) ABSTRACT

Disclosed are methods, systems, and computer-readable medium to perform operations including: receiving a real-time density log comprising bulk density readings of a subterranean formation, where a well is being drilled in the subterranean formation; aggregating density readings over a first threshold distance from a current drilling depth in the subterranean formation; calculating a minimum formation density and a maximum formation density in the aggregated density readings; calculating a difference between the maximum formation density and the minimum formation density; in response to determining that the difference is greater than a field threshold, determining whether a previous kick alert occurred at least a second threshold distance from the current drilling depth; and in response to determining that the previous kick alert occurred at least the second threshold distance from the current drilling depth, detecting a kick in the well.

20 Claims, 5 Drawing Sheets

(51) Int. Cl.
   *E21B 47/07*      (2012.01)
   *E21B 47/06*      (2012.01)
   *G01V 11/00*      (2006.01)

(56) References Cited

U.S. PATENT DOCUMENTS

| | | | |
|---|---|---|---|
| 6,100,696 | A | 8/2000 | Sinclair |
| 6,206,108 | B1 * | 3/2001 | MacDonald .......... E21B 49/005 175/24 |
| 6,534,980 | B2 | 2/2003 | Toufaily et al. |
| 6,768,106 | B2 * | 7/2004 | Gzara .................... E21B 44/00 250/269.3 |
| 6,923,273 | B2 * | 8/2005 | Terry ...................... E21B 4/18 175/45 |
| 7,376,514 | B2 | 5/2008 | Habashy et al. |
| 7,546,884 | B2 * | 6/2009 | Veeningen .............. E21B 7/04 175/40 |
| 8,237,444 | B2 | 8/2012 | Simon |
| 8,307,913 | B2 * | 11/2012 | Dolman .................. E21B 34/08 175/38 |
| 8,794,062 | B2 | 8/2014 | DiFoggio et al. |
| 8,884,624 | B2 | 11/2014 | Homan et al. |
| 8,990,020 | B2 * | 3/2015 | Pfutzner ................ E21B 49/08 702/6 |
| 9,057,799 | B2 | 6/2015 | Allen |
| 9,394,783 | B2 * | 7/2016 | Rasmus .................. E21B 34/06 |
| 9,556,726 | B2 | 1/2017 | Kouchnneshky |
| 9,562,987 | B2 | 2/2017 | Guner et al. |
| 9,989,666 | B2 | 6/2018 | Terentev |
| 10,082,530 | B1 | 9/2018 | Teremce et al. |
| 10,253,620 | B1 | 4/2019 | Rose et al. |
| 10,401,203 | B2 | 9/2019 | Fanini |
| 10,865,640 | B2 | 12/2020 | Alvarez |
| 2006/0016592 | A1 | 1/2006 | Wu |
| 2008/0047337 | A1 | 2/2008 | Chemali et al. |
| 2010/0025112 | A1 | 2/2010 | Sroka |
| 2010/0071894 | A1 | 3/2010 | Benischek |
| 2013/0118734 | A1 | 5/2013 | Csutak |
| 2014/0291023 | A1 | 10/2014 | Edbury |
| 2016/0033675 | A1 | 2/2016 | Csutak |
| 2016/0222741 | A1 | 8/2016 | Lovorn et al. |
| 2016/0237810 | A1 | 8/2016 | Beaman et al. |
| 2016/0363686 | A1 | 12/2016 | Kouchmeshky |
| 2018/0187498 | A1 | 7/2018 | Soto et al. |
| 2019/0036621 | A1 | 1/2019 | VanWiggeren |
| 2019/0078405 | A1 * | 3/2019 | Zheng .................... E21B 47/18 |

OTHER PUBLICATIONS

Carpenter, "Advancing Deepwater Kick Detection", JPT, vol. 68, Issue 5, May 2016, 2 pages.
Johnson et al., "Advanced Deepwater Kick Detection," IADC/SPE 167990, presented at the 2014 IADC/SPE Drilling Conference and Exhibition, Mar. 4-6, 2014, 10 pages.
Olver A. D., ., "Compact Antenna Test Ranges," Seventh International Conference on Antennas and Propagation IEEE , Apr. 15-18, 1991, 10 pages.
Parini et al., "Chapter 3: Antenna measurements," in Theory and Practice of Modem Antenna Range Measurements, IET editorial, 2014, 30 pages.
Petrowiki.org [online], "Kicks," Petrowiki, available on or before Jun. 26, 2015, retrieved on Jan. 24, 2018, retrieved from URL <https://petrowiki.org/Kicks>, 6 pages.
rigzone.com [online], "How does Well Control Work?" Rigzone, available on or before 1999, retrieved on Jan. 24, 2019, retrieved from URL <https://www.rigzone.com/training/insight.asp?insight_id=304&c_id>, 5 pages.
PCT International Search Report and Written Opinion issued in International Application No. PCT/US2020/027366 dated Jul. 21, 2020, 15 pages.
Mvg, "Compact Range Overview," www.mvg-world.com/CR, Dec. 31, 2018, 16 pages.

* cited by examiner

KICK DETECTION USING LOGGING WHILE DRILLING

TECHNICAL FIELD

The present disclosure relates to well operations, for example, in wells formed in hydrocarbon-carrying reservoirs.

BACKGROUND

Kick is a wellbore drilling problem that occurs during well drilling operations. Specifically, kick occurs when a formation pressure is greater than a drilling fluid hydrostatic pressure acting on a drilled surface of the formation. In this scenario, the greater formation pressure drives formation fluids into the wellbore. In some scenarios, a kick increases in severity and becomes uncontrolled, resulting in a "blowout." If the flow of formation fluids is controlled before a blowout occurs, then the kick is effectively "killed." Example causes of the imbalance between formation pressure and drilling fluid hydrostatic pressure that results in kicks include insufficient drilling fluid weight, swabbing, and lost circulation.

SUMMARY

In practice, there are techniques, referred to as well control, that are used to maintain hydrostatic pressure at a value greater than the formation pressure in order to avoid or mitigate kicks. Many techniques involve suppressing kicks immediately after they initiate (that is, when the kicks are near an intensity at which they can be controlled or killed with application of minimal external force). Therefore, detecting kicks early (for example, when a kick intensity is weak) is important for well control techniques to be effective. Detecting kicks early is particularly important in modern productions fields that include areas with increasingly tight pressure margins (for example, deep water). In such areas, detecting kicks early is important since the tight pressure margins can result in a kick rapidly increasing in intensity. Thus, as pressure margins become tighter, more accurate and earlier kick detection is needed.

The present disclosure describes a method for kick detection based on a real-time change in bulk density of the formation. Specifically, the method is based on an empirical finding that a change in bulk density greater than a predetermined threshold can be indicative of a kick. As such, in an embodiment, the method involves monitoring the real-time change in bulk density. If the real-time change in density of the formation exceeds the predetermined threshold, then the method involves generating an alert indicative of a kick.

Aspects of the subject matter described in this specification may be embodied in methods that include the actions of: receiving a real-time density log comprising bulk density readings of a subterranean formation, where a well is being drilled in the subterranean formation; aggregating density readings over a first threshold distance from a current drilling depth in the subterranean formation; calculating a minimum formation density and a maximum formation density in the aggregated density readings; calculating a difference between the maximum formation density and the minimum formation density; in response to determining that the difference is greater than a field threshold, determining whether a previous kick alert occurred at least a second threshold distance from the current drilling depth; and in response to determining that the previous kick alert occurred at least the second threshold distance from the current drilling depth, detecting a kick in the well.

The previously described implementation is implementable using a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium. These and other embodiments may each optionally include one or more of the following features.

In a first aspect, the actions further comprising: in response to detecting a kick in the well, outputting an alert indicative of the detected kick.

In a second aspect, where the real-time density log is generated by logging while drilling (LWD).

In a third aspect, where the first threshold distance from a current drilling depth is 100 feet.

In a fourth aspect, where the second threshold distance from a current drilling depth is 50 feet.

In a fifth aspect, where the field threshold is 0.6 gram/cubic centimeter (g/cc).

In a sixth aspect, where the field threshold is calculated based on formation lithology, drilling fluid density, formation pressure, and formation temperature.

Particular implementations of the subject matter described in this disclosure can be implemented to realize one or more of the following advantages. The disclosed kick detection method is based on real-time data, and therefore, provides more accurate and quicker kick detection than existing methods.

The details of one or more implementations of the subject matter of this disclosure are set forth in the description, the claims, and the accompanying drawings. Other features, aspects, and advantages of the subject matter will become apparent from the description, the claims, and the accompanying drawings.

BRIEF DESCRIPTION OF THE DRAWINGS

Like reference numbers and designations in the various drawings indicate like elements.

DETAILED DESCRIPTION

The following detailed description describes systems and methods for detection of kicks in wells. The description is presented to enable a person skilled in the art to make and use the disclosed subject matter in the context of one or more particular implementations. Various modifications, alterations, and permutations of the disclosed implementations can be made and will be readily apparent to those skilled in the art. Furthermore, the general principles defined may be applied to other implementations and applications without departing from the scope of the disclosure. Thus, the present disclosure is not intended to be limited to the described or illustrated implementations. Rather, the present disclosure is to be accorded the widest scope consistent with the principles and features disclosed.

One issue in kick detection is that conditions indicating that a kick has occurred, or is about to occur, typically develop downhole. Often, these downhole conditions are not readily detectible at the surface of the well by conventional methods, such as monitoring mud pit volume. Although some conditions can be detected eventually at the surface of the well, the delay between occurrence downhole and detection at the surface can delay a timely reaction that could minimize undesirable consequences of the kick. Another drawback of conventional methods is the inability to detect a kick in total loss circulation conditions because wellbore fluids are lost to the formation and do not return to the surface. Yet another potential issue is reliance on an operator's judgment. For example, many of the measured well conditions may be correlated to the kick without the operator recognizing their significance in a timely manner or the urgent need to take action.

The subject matter in this disclosure is directed to resolving, or at least reducing, the problems associated with delayed well kick detection in a well that is being drilled in a formation. The disclosed kick detection method is based on the empirical finding that anomalies in the bulk density of the formation are indicative of kicks. In an embodiment, the disclosed kick detection method involves monitoring the bulk density of the formation for such anomalies. Then, in response to detecting a bulk density anomaly, the kick detection method determines whether an alert has already been generated for this anomaly. In response to determining that an alert has not been generated for the detected anomaly, the kick detection method includes detecting a kick. Once a kick is detected, the kick detection method involves taking a remedial action. For example, the kick detection method transmits alarm signals to alert operators of the detected kick.

Figure 1A:
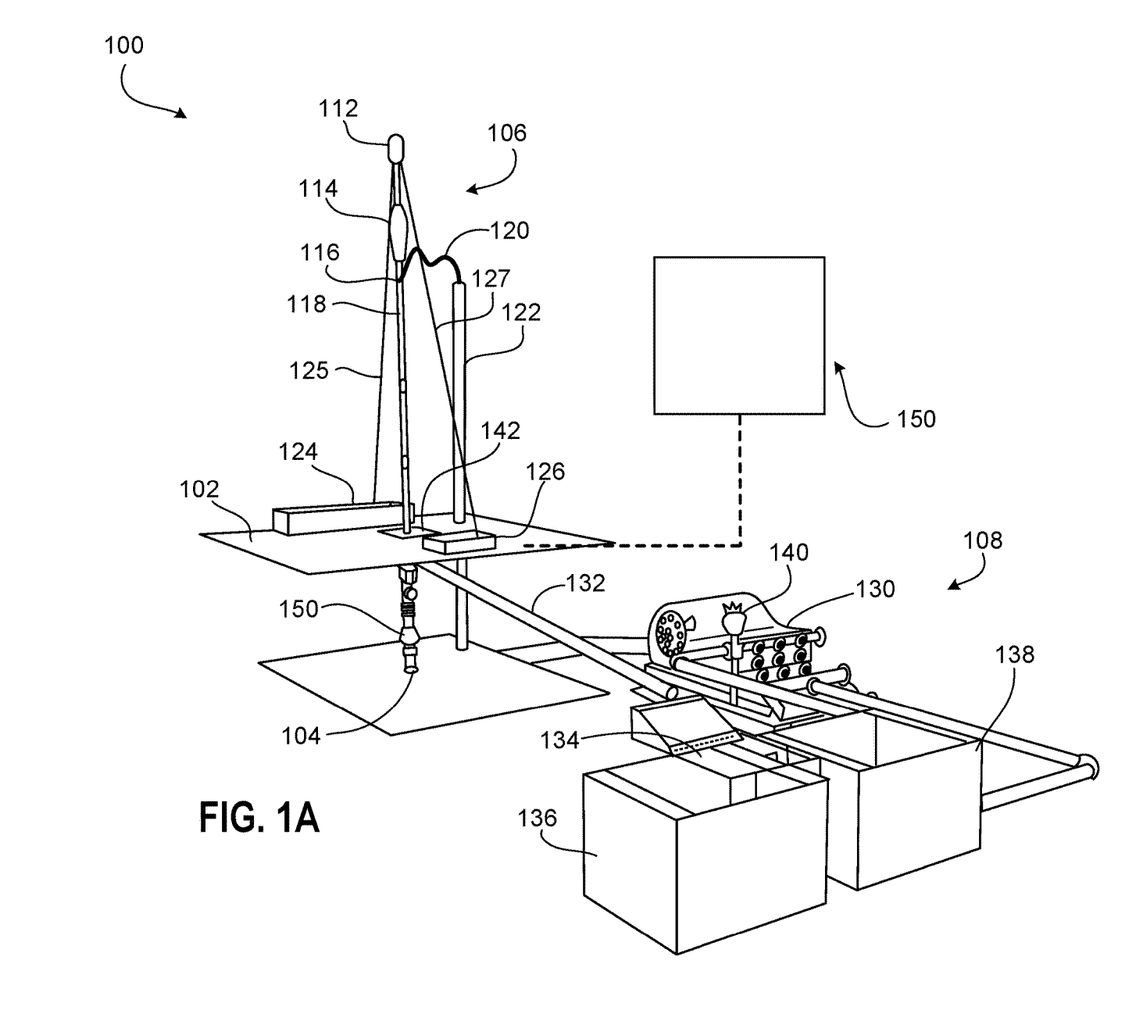
FIG. 1A is a schematic view of an example rig system for a well, according to some implementations of the present disclosure.

FIG. 1A is a partial schematic perspective view of an example rig system 100 for drilling and producing a well. The well can extend from the surface through the Earth to one or more subterranean zones of interest. The example rig system 100 includes a drill floor 102 positioned above the surface, a wellhead 104, a drill string assembly 106 supported by the rig structure, a fluid circulation system 108 to filter used drilling fluid (also referred to as "drilling mud" or "mud") from the wellbore and provide clean drilling fluid to the drill string assembly 106, and a kick detection system 150 (described in more detail in FIG. 1B). For example, the example rig system 100 of FIG. 1A is shown as a drill rig capable of performing a drilling operation with the rig system 100 supporting the drill string assembly 106 over a wellbore. The wellhead 104 can be used to support casing or other well components or equipment into the wellbore of the well.

The derrick or mast is a support framework mounted on the drill floor 102 and positioned over the wellbore to support the components of the drill string assembly 106 during drilling operations. A crown block 112 forms a longitudinally-fixed top of the derrick, and connects to a travelling block 114 with a drilling line including a set of wire ropes or cables. The crown block 112 and the travelling block 114 support the drill string assembly 106 via a swivel 116, a kelly 118, or a top drive system (not shown). Longitudinal movement of the travelling block 114 relative to the crown block 112 of the drill string assembly 106 acts to move the drill string assembly 106 longitudinally upward and downward. The swivel 116, connected to and hung by the travelling block 114 and a rotary hook, allows free rotation of the drill string assembly 106 and provides a connection to a kelly hose 120, which is a hose that flows drilling fluid from a drilling fluid supply of the circulation system 108 to the drill string assembly 106. A standpipe 122 mounted on the drill floor 102 guides at least a portion of the kelly hose 120 to a location proximate to the drill string assembly 106. The kelly 118 is a hexagonal device suspended from the swivel 116 and connected to a longitudinal top of the drill string assembly 106, and the kelly 118 turns with the drill string assembly 106 as the rotary table 142 of the drill string assembly turns.

In the example rig system 100 of FIG. 1A, the drill string assembly 106 is made up of drill pipes with a drill bit (not shown) at a longitudinally bottom end of the drill string. The drill pipe can include hollow steel piping, and the drill bit can include cutting tools, such as blades, discs, rollers, cutters, or a combination of these, to cut into the formation and form the wellbore. The drill bit rotates and penetrates through rock formations below the surface under the combined effect of axial load and rotation of the drill string assembly 106. In some implementations, the kelly 118 and swivel 116 can be replaced by a top drive that allows the drill string assembly 106 to spin and drill. The wellhead assembly 104 can also include a drawworks 124 and a deadline anchor 126, where the drawworks 124 includes a winch that acts as a hoisting system to reel the drilling line in and out to raise and lower the drill string assembly 106 by a fast line 125. The deadline anchor 126 fixes the drilling line opposite the drawworks 124 by a deadline 127, and can measure the suspended load (or hook load) on the rotary hook. The weight on bit (WOB) can be measured when the drill bit is at the bottom the wellbore. The wellhead assembly 104 also includes a blowout preventer 150 positioned at the surface 101 of the well and below (but often connected to) the drill floor 102. The blowout preventer 150 acts to prevent well blowouts caused by formation fluid entering the wellbore, displacing drilling fluid, and flowing to the surface at a pressure greater than atmospheric pressure. The blowout preventer 150 can close around (and in some instances, through) the drill string assembly 106 and seal off the space between the drill string and the wellbore wall.

During a drilling operation of the well, the circulation system 108 circulates drilling fluid from the wellbore to the drill string assembly 106, filters used drilling fluid from the wellbore, and provides clean drilling fluid to the drill string assembly 106. The example circulation system 108 includes a fluid pump 130 that fluidly connects to and provides drilling fluid to drill string assembly 106 via the kelly hose 120 and the standpipe 122. The circulation system 108 also includes a flow-out line 132, a shale shaker 134, a settling pit 136, and a suction pit 138. In a drilling operation, the circulation system 108 pumps drilling fluid from the surface, through the drill string assembly 106, out the drill bit and back up the annulus of the wellbore, where the annulus is the space between the drill pipe and the formation or casing. The density of the drilling fluid is intended to be greater than the formation pressures to prevent formation fluids from entering the annulus and flowing to the surface and less than the mechanical strength of the formation, as a greater density may fracture the formation, thereby creating a path for the drilling fluids to go into the formation. Apart from well control, drilling fluids can also cool the drill bit and lift rock cuttings from the drilled formation up the annulus and to the surface to be filtered out and treated before it is pumped down the drill string assembly 106 again. The drilling fluid returns in the annulus with rock cuttings and flows out to the flow-out line 132, which connects to and provides the fluid to the shale shaker 134. The flow line is an inclined pipe that directs the drilling fluid from the annulus to the shale shaker 134. The shale shaker 134 includes a mesh-like surface to separate the coarse rock cuttings from the drilling fluid, and finer rock cuttings and drilling fluid then go through the settling pit 136 to the suction pit 136. The circulation system 108 includes a mud hopper 140 into which materials (for example, to provide dispersion, rapid hydration, and uniform mixing) can be introduced to the circulation system 108. The fluid pump 130 cycles the drilling fluid up the standpipe 122 through the swivel 116 and back into the drill string assembly 106 to go back into the well.

The example wellhead assembly 104 can take a variety of forms and include a number of different components. For example, the wellhead assembly 104 can include additional or different components than the example shown in FIG. 1A. Similarly, the circulation system 108 can include additional or different components than the example shown in FIG. 1A.

Figure 1B:
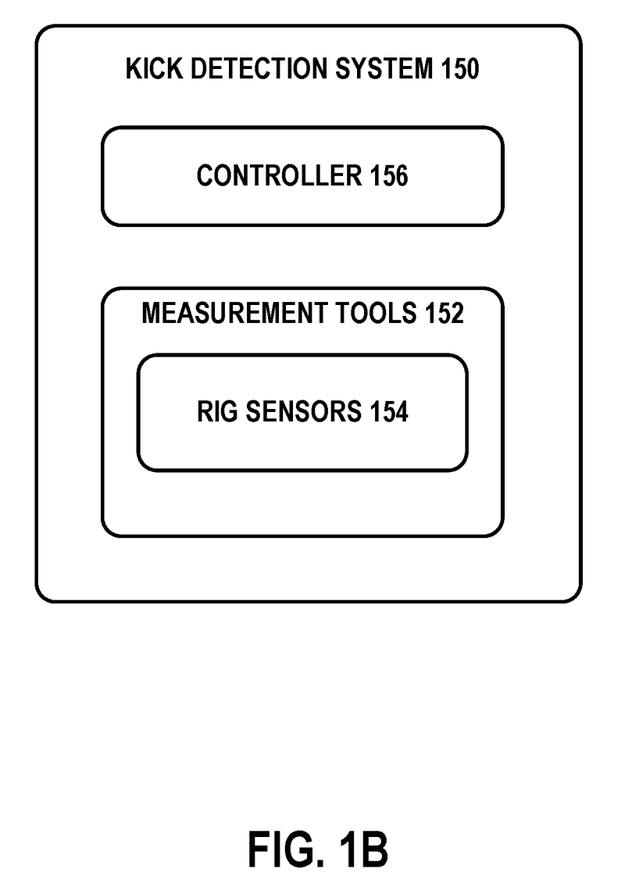
FIG. 1B is a block diagram of an example kick detection system, according to some implementations of the present disclosure.

The kick detection system 150 is configured to monitor real-time data in order to detect kicks in the wellbore. In an embodiment, the real-time data is collected by measurement tools 152. The measurement tools 152 include sensors, tools, and devices (for example, measurement while drilling (MWD) devices and logging while drilling (LWD) devices) that are configured to gather real-time data associated with the drilling operation (for example, porosity, resistivity, acoustic waveform, hole direction, weight on bit, drilling direction, drilling orientation, and drill bit information). For example, rig sensors 154 gather real-time surface data. The rig sensors 154 include depth-tracking sensors (for example, a hole depth sensor), flow-in tracking sensors (for example, to measure flow-in from a mud pump), pressure-tracking sensors, flow-out tracking sensors, drill-monitor sensors (for example, bit depth sensors, bit-rotating hours sensor, torque sensor, and weight-on-bit sensor), pit-monitor sensors (for example, pit volume sensor, pump stroke sensor, and trip tank sensor), and gas-detection sensors. The real-time data gathered by the measurement tools 152 can be used to make informed drilling and geological decisions (for example, manually, autonomously, or both).

As described below, a controller 156 of the kick detection system 150 uses the real-time data to detect kicks in the wellbore. Detecting kicks can include predicting kicks before they actually occur, detecting kicks at an early stage (for example, before the kick becomes uncontrolled), or both. In an embodiment, the controller 156 is implemented on one or more computer systems, such as the computer system 400 shown in FIG. 4.

Figure 2:
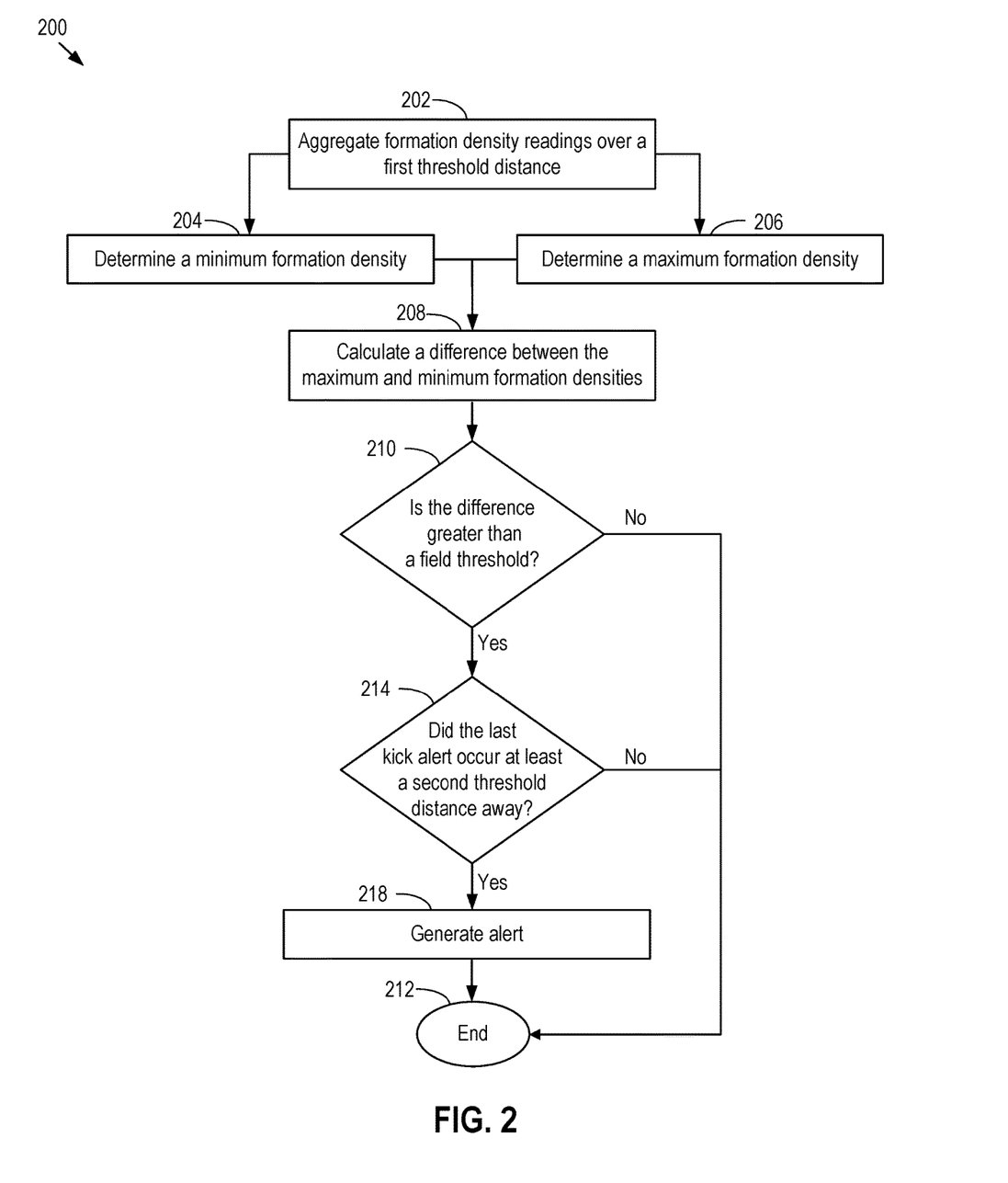
FIG. 2 is a flowchart of an example method for kick detection, according to some implementations of the present disclosure.

FIG. 2 illustrates a flowchart of a method 200 for kick detection, according to some implementations. For clarity of presentation, the description that follows generally describes method 200 in the context of the other figures in this description. For example, the method 200 can be performed by the kick detection system 150 shown in FIG. 1B. However, it will be understood that the method 200 may be performed, for example, by any suitable system, environment, software, and hardware, or a combination of systems, environments, software, and hardware, as appropriate. In some embodiments, various steps of the method 200 can be run in parallel, in combination, in loops, or in any order.

In an embodiment, the kick detection system 150 performs the method 200 periodically while the drilling system 100 drills a wellbore. The periodicity in which the method 200 is performed can be based on drilling time or drilling depth. As an example of a time-based periodicity, the kick detection system 150 performs the method 200 every 10 minutes. As an example of depth-based periodicity, the kick detection system 150 performs the method 200 every 15 feet of drilling depth. In other embodiments, the kick detection system 150 performs the method 200 continuously.

The kick detection system 150 starts the method 200 at step 202. At step 202, the kick detection system 150 aggregates formation density readings over a first threshold distance from a current drilling depth. In an embodiment, the formation density readings of the formation in which the drilling system 100 is drilling are extracted from a density log of the formation. In an embodiment, the kick detection system 150 receives the density log from measurement tools 152. As previously explained, the measurement tools 152 generate the density log using one or more tools, such as logging while drilling (LWD). In some examples, the kick detection system 150 periodically receives an updated density log from the measurement tools 152. Upon receipt of the density log, the kick detection system 150 extracts the formation density readings from the density log.

Once the kick detection system 150 extracts the formation density readings from the density log, the kick detection system 150 aggregates the formation density readings over the first threshold distance above the current drilling depth. Aggregating the formation density readings may involve combining the data in one file or source. In an example, the threshold distance is 100 feet (ft.). In this example, the kick detection system 150 aggregates the formation density readings over 100 feet from a current drilling depth. For instance, if the current drilling depth is 400 feet, the kick detection system 150 aggregates the formation density readings from 300 feet to 400 feet in depth. Once the kick detection system 150 aggregates the formation density readings, the kick detection system 150 moves to steps 204 and 206. These steps can be performed sequentially or simultaneously. Note that the threshold distance of 100 ft is an empirically derived threshold distance. However, other threshold distances are also possible.

At step 204, the kick detection system 150 determines a minimum formation density in the aggregated formation density readings. The kick detection system 150 can analyze the aggregated formation density in order to determine the minimum formation density of the portion of the formation along the first threshold distance from the current drilling depth. Continuing with the previous example, the kick detection system 150 determines the minimum formation density in the portion of the formation from 300 feet to 400 feet in depth.

At step 206, the kick detection system 150 determines a maximum formation density in the aggregated formation density readings. The kick detection system 150 can analyze the aggregated formation density in order to determine the maximum formation density of the portion of the formation along the first threshold distance from the current drilling depth. Continuing with the previous example, the kick detection system 150 determines the maximum formation density in the portion of the formation from 300 feet to 400 feet in depth.

At step 208, the kick detection system 150 calculates a difference between the maximum formation density and the minimum formation density. Specifically, the minimum formation density is subtracted from the maximum formation density.

At step 210, the kick detection system 150 determines if the difference between the maximum and minimum formation densities is greater than a field threshold. In an embodiment, a field threshold is a formation specific value that is empirically determined based on lithology, fluid density, formation pressure, and formation temperature. The field threshold is indicative of the maximum allowable bulk density change in the formation. A change in density greater than the field threshold is indicative of a kick. Thus, the difference between the maximum and minimum formation densities being greater than the field threshold is indicative of a kick. Accordingly, if the difference is not greater than the field threshold, the kick detection system 150 does not detect a kick. The kick detection system 150 then moves to step 212, where the method 200 is terminated (until the next iteration of performing the method 200). Conversely, if the difference is greater than the field threshold, the kick detection system 150 detects a kick (for example, a kick has occurred or will likely occur). The kick detection system 150 then moves to step 214.

At step 214, the kick detection system 150 determines if the last kick alert occurred at least a second threshold distance away from the current drilling depth. Since the steps of method 200 are performed periodically, there may have been a kick alert that was generated in the last iteration of the method. This step determines when the last kick alert occurred in order to ensure that the kick detection system 150 does not generate an alert for the same detected kick more than once. Thus, if the kick detection system 150 determines that the last kick alert did not occur at least the second threshold distance away from the current drilling depth, then the kick detection system 150 determines that a kick alert has already been generated for the detected kick. The kick detection system 150 then moves to step 212, where method 200 is terminated. On the other hand, if the kick detection system 150 determines that the last kick alert occurred at least the second threshold distance away from the current depth, then the kick detection system 150 determines that an alert has not been generated for the detected kick. Then, the kick detection system 150 moves to step 218. In an example, the second threshold distance is 50 feet. Note that the second threshold distance of 50 ft is an empirically derived threshold distance. However, other threshold distances are also possible.

At step 218, the kick detection system 150 generates an alert indicative of the detected kick. The alert may take one or more forms. In an example, generating the alert involves transmitting alarm signals to alert operators of the detected kick. In another example, generating the alert involves providing instructions to a computing device to output a notification (for example, audible or visual) indicative of the detected kick. Other example alerts are also possible.

Figure 3:
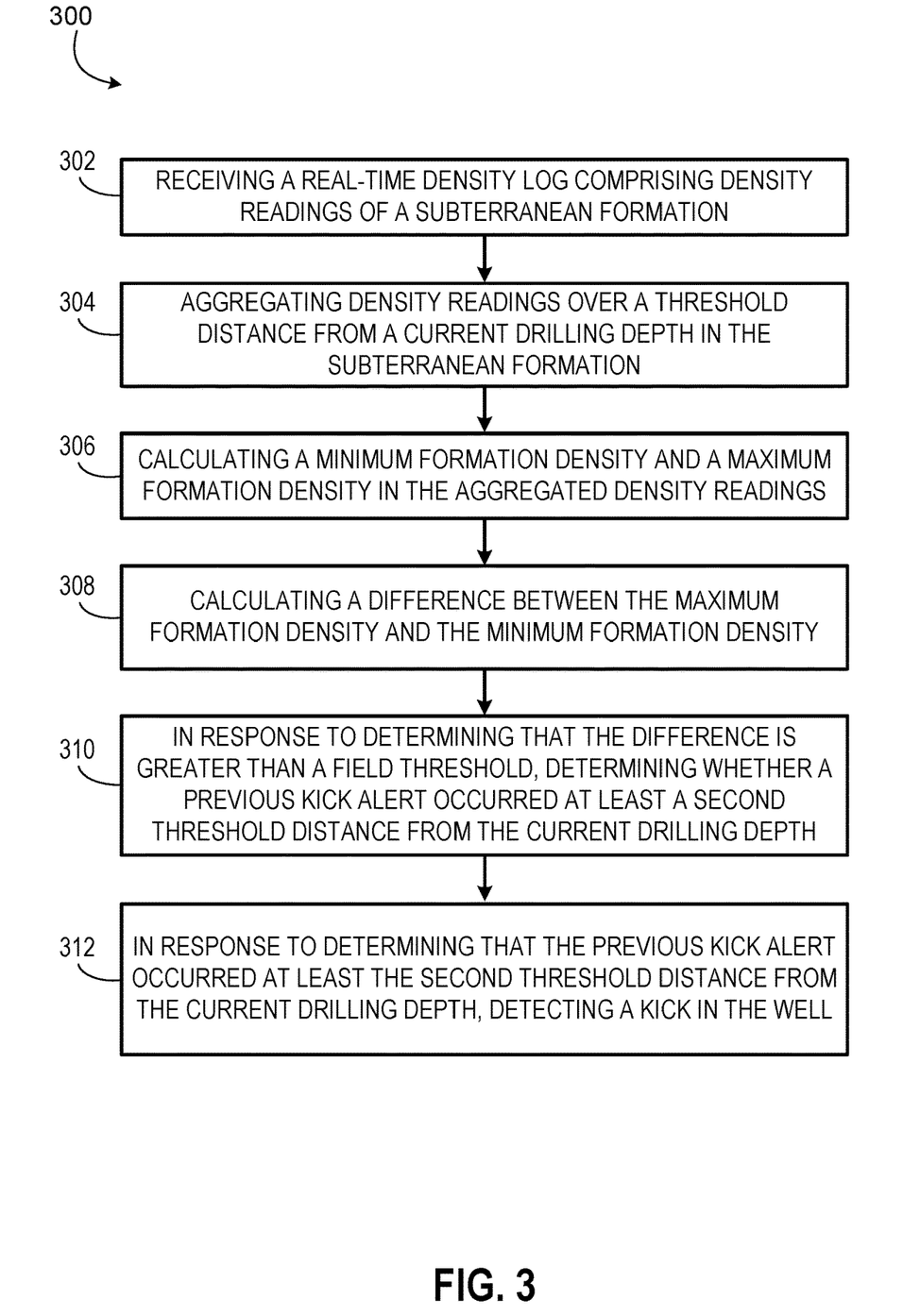
FIG. 3 is a flowchart of another example method for kick detection, according to some implementations of the present disclosure.

FIG. 3 is a simplified block diagram of an example method 300 for calculating a quality factor of a subterranean formation, according to some implementations. For clarity of presentation, the description that follows generally describes method 300 in the context of the other figures in this description. For example, method 300 can be performed by a computer system described in FIG. 4. However, it will be understood that method 300 may be performed, for example, by any suitable system, environment, software, and hardware, or a combination of systems, environments, software, and hardware, as appropriate. In some implementations, various steps of method 300 can be run in parallel, in combination, in loops, or in any order.

At step 302, method 300 involves receiving a real-time density log comprising density readings of a subterranean formation.

At step 304, method 300 involves aggregating density readings over a threshold distance from a current drilling depth in the subterranean formation.

At step 306, method 300 involves calculating a minimum formation density and a maximum formation density in the aggregated density readings.

At step 308, method 300 involves calculating a difference between the maximum formation density and the minimum formation density.

At step 310, method 300 involves in response to determining that the difference is greater than a field threshold, determining whether a previous kick alert occurred at least a second threshold distance from the current drilling depth.

At step 312, method 300 involves in response to determining that the previous kick alert occurred at least the second threshold distance from the current drilling depth, detecting a kick in the well.

The example method 300 shown in FIG. 3 can be modified or reconfigured to include additional, fewer, or different steps (not shown in FIG. 3), which can be performed in the order shown or in a different order. As an example, after step 312, the method 300 can include in response to detecting a kick in the well, performing a remedial action to prevent or mitigate the detected kick. As an example, the remedial action involves generating an alert indicative of the detected kick. As another example, the remedial action involves checking flow levels of drilling fluid and increasing mud weight.

Figure 4:
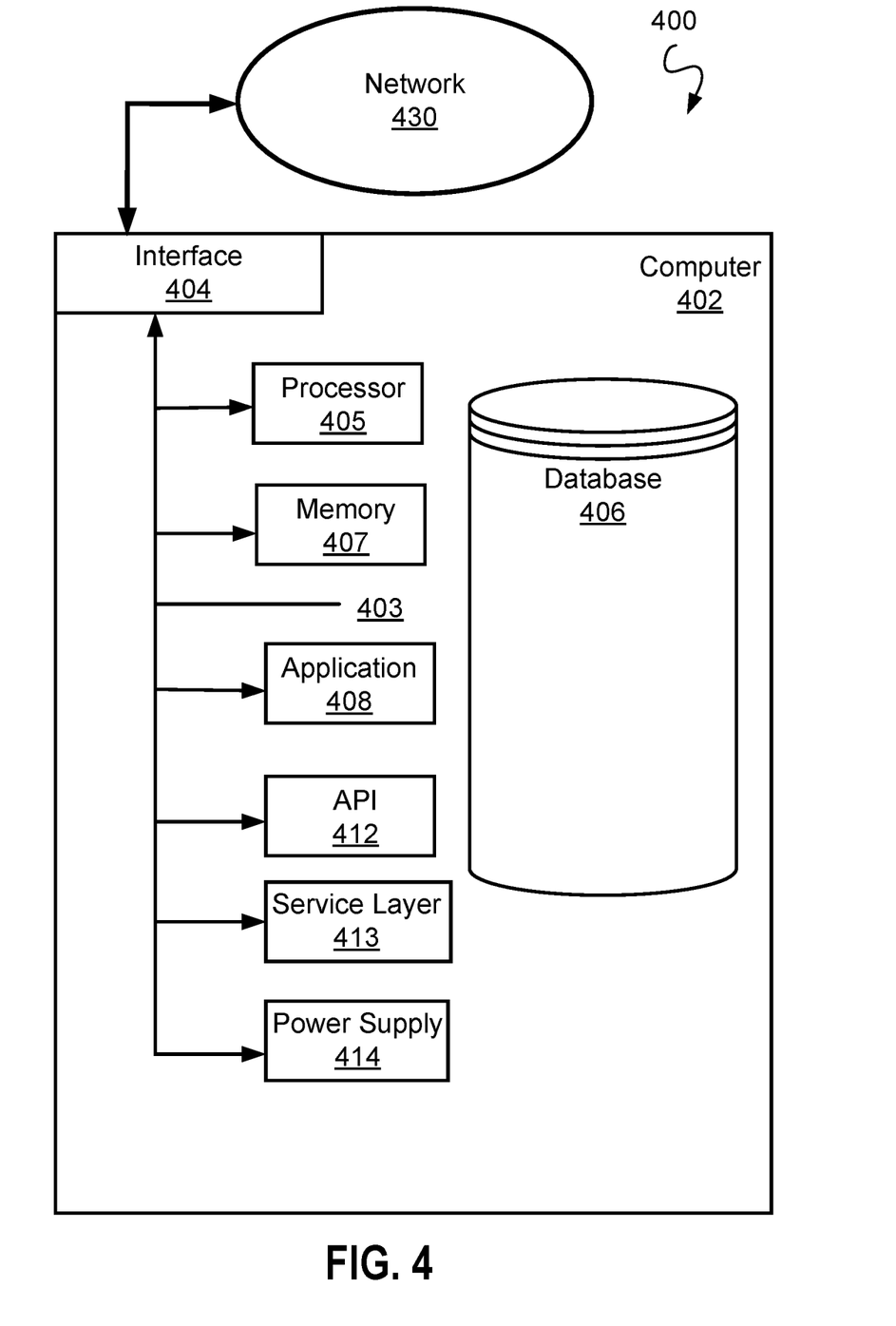
FIG. 4 is a block diagram of an example computer system used to provide computational functionalities associated with described algorithms, methods, functions, processes, flows, and procedures as described in the present disclosure, according to some implementations of the present disclosure.

FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. In addition, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both), over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure.

Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

We claim:
1. A computer-implemented method comprising:
  receiving a real-time density log comprising bulk density readings of a subterranean formation, wherein a well is being drilled in the subterranean formation;
  aggregating at least a portion of the bulk density readings over a first threshold distance from a current drilling depth in the subterranean formation;

calculating a minimum formation density and a maximum formation density in the aggregated density readings;

calculating a difference between the maximum formation density and the minimum formation density;

in response to determining that the difference is greater than a field threshold, determining whether a previous kick alert occurred at least a second threshold distance from the current drilling depth; and in response to determining that the previous kick alert occurred at least the second threshold distance from the current drilling depth, detecting a kick in the well.

2. The computer-implemented method of claim 1, further comprising:

in response to detecting the kick in the well, outputting an alert indicative of the detected kick.

3. The computer-implemented method of claim 1, wherein the real-time density log is generated by logging while drilling (LWD).

4. The computer-implemented method of claim 1, wherein the first threshold distance from a current drilling depth is 100 feet.

5. The computer-implemented method of claim 1, wherein the second threshold distance from a current drilling depth is 50 feet.

6. The computer-implemented method of claim 1, wherein the field threshold is 0.6 gram/cubic centimeter (g/cc).

7. The computer-implemented method of claim 1, wherein the field threshold is calculated based on formation lithology, drilling fluid density, formation pressure, and formation temperature.

8. A device comprising:

one or more processors; and a non-transitory computer-readable storage medium coupled to the one or more processors and storing programming instructions for execution by the one or more processors, the programming instructions instructing the one or more processors to perform operations comprising:

receiving a real-time density log comprising bulk density readings of a subterranean formation, wherein a well is being drilled in the subterranean formation;

aggregating at least a portion of the bulk density readings over a first threshold distance from a current drilling depth in the subterranean formation;

calculating a minimum formation density and a maximum formation density in the aggregated density readings;

calculating a difference between the maximum formation density and the minimum formation density;

in response to determining that the difference is greater than a field threshold, determining whether a previous kick alert occurred at least a second threshold distance from the current drilling depth; and in response to determining that the previous kick alert occurred at least the second threshold distance from the current drilling depth, detecting a kick in the well.

9. The device of claim 8, the operations further comprising:

in response to detecting the kick in the well, outputting an alert indicative of the detected kick.

10. The device of claim 8, wherein the real-time density log is generated by logging while drilling (LWD).

11. The device of claim 8, wherein the first threshold distance from a current drilling depth is 100 feet.

12. The device of claim 8, wherein the second threshold distance from a current drilling depth is 50 feet.

13. The device of claim 8, wherein the field threshold is 0.6 gram/cubic centimeter (g/cc).

14. The device of claim 8, wherein the field threshold is calculated based on formation lithology, drilling fluid density, formation pressure, and formation temperature.

15. A non-transitory computer-readable medium storing instructions executable by a computer system to perform operations comprising:

receiving a real-time density log comprising bulk density readings of a subterranean formation, wherein a well is being drilled in the subterranean formation;

aggregating at least a portion of the bulk density readings over a first threshold distance from a current drilling depth in the subterranean formation;

calculating a minimum formation density and a maximum formation density in the aggregated density readings;

calculating a difference between the maximum formation density and the minimum formation density;

in response to determining that the difference is greater than a field threshold, determining whether a previous kick alert occurred at least a second threshold distance from the current drilling depth; and in response to determining that the previous kick alert occurred at least the second threshold distance from the current drilling depth, detecting a kick in the well.

16. The non-transitory computer-readable medium of claim 15, the operations further comprising:

in response to detecting the kick in the well, outputting an alert indicative of the detected kick.

17. The non-transitory computer-readable medium of claim 15, wherein the real-time density log is generated by logging while drilling (LWD).

18. The non-transitory computer-readable medium of claim 15, wherein the first threshold distance from a current drilling depth is 100 feet.

19. The non-transitory computer-readable medium of claim 15, wherein the second threshold distance from a current drilling depth is 50 feet.

20. The non-transitory computer-readable medium of claim 15, wherein the field threshold is 0.6 gram/cubic centimeter (g/cc).

* * * * *